United States Patent
Aydin et al.

(10) Patent No.: US 11,340,585 B2
(45) Date of Patent: May 24, 2022

(54) ADDITIVE MANUFACTURING OF INVERSE-DESIGNED METADEVICES

(71) Applicant: Northwestern University, Evanston, IL (US)

(72) Inventors: Koray Aydin, Wilmette, IL (US); Francois Callewaert, Evanston, IL (US); Alan Varteres Sahakian, Northbrook, IL (US)

(73) Assignee: Northwestern University, Evanston, IL (US)

( * ) Notice: Subject to any disclaimer, the term of this patent is extended or adjusted under 35 U.S.C. 154(b) by 138 days.

(21) Appl. No.: 16/624,010

(22) PCT Filed: Jun. 26, 2018

(86) PCT No.: PCT/US2018/039433
§ 371 (c)(1),
(2) Date: Dec. 18, 2019

(87) PCT Pub. No.: WO2019/005751
PCT Pub. Date: Jan. 3, 2019

(65) Prior Publication Data
US 2020/0174449 A1    Jun. 4, 2020

Related U.S. Application Data

(60) Provisional application No. 62/524,715, filed on Jun. 26, 2017.

(51) Int. Cl.
*G05B 19/4099* (2006.01)
*B33Y 50/02* (2015.01)
(Continued)

(52) U.S. Cl.
CPC .......... *G05B 19/4099* (2013.01); *B33Y 50/02* (2014.12); *B33Y 80/00* (2014.12);
(Continued)

(58) Field of Classification Search
CPC ...... G05B 19/4099; G05B 2219/49246; B33Y 50/02; B33Y 80/00; G02B 1/002; G02B 5/1847
See application file for complete search history.

(56) References Cited

U.S. PATENT DOCUMENTS

| 10,725,290 B2 * | 7/2020 | Fan | G02B 1/002 |
| 2011/0205583 A1 * | 8/2011 | Young | G06T 19/20 |
| | | | 358/1.15 |

(Continued)

OTHER PUBLICATIONS

J. B. Pendry et al., Controlling electromagnetic fields. *Science* 312, 1780-1782 (2006).
(Continued)

*Primary Examiner* — Thomas C Lee
*Assistant Examiner* — Ameir Myers
(74) *Attorney, Agent, or Firm* — Bell & Manning, LLC

(57) ABSTRACT

A method for creating metadevices includes receiving, at a computing device, one or more boundary conditions for a metadevice. The method also includes processing, with an inverse-design algorithm stored in a memory of the computing device, the one or more boundary conditions to generate a metadevice structure design that satisfies the one or more boundary conditions. The method also includes converting, by a processor of the computing device, the metadevice structure design into a file that is compatible with an additive manufacturing device. The method further includes providing the file of the metadevice structure design to the additive manufacturing device.

16 Claims, 16 Drawing Sheets

(51) Int. Cl.
　　　*B33Y 80/00*　　(2015.01)
　　　*G02B 1/00*　　(2006.01)
　　　*G02B 5/18*　　(2006.01)
(52) U.S. Cl.
　　　CPC ........... *G02B 1/002* (2013.01); *G02B 5/1847*
　　　　　　　　(2013.01); *G05B 2219/49246* (2013.01)

(56) References Cited

U.S. PATENT DOCUMENTS

| | | | | |
|---|---|---|---|---|
| 2016/0114542 | A1* | 4/2016 | Quere | G02C 7/022 |
| | | | | 264/1.1 |
| 2018/0121580 | A1* | 5/2018 | Tsang | G06F 17/12 |
| 2018/0319110 | A1* | 11/2018 | Solgaard | B29D 11/00442 |
| 2018/0350111 | A1* | 12/2018 | Chae | G06T 11/006 |
| 2020/0183050 | A1* | 6/2020 | Lin | G02B 1/002 |

OTHER PUBLICATIONS

U. Leonhardt, Optical conformal mapping. *Science* 312, 1777-1780 (2006).
J. B. Pendry, Negative Refraction Makes a Perfect Lens. *Physical Review Letters* 85, 3966-3969 (2000).
R. A. Shelby, D. R. Smith, S. Schultz, Experimental Verification of a Negative Index of Refraction. *Science* 292, 77-79 (2001).
N. Fang et al., Sub-Diffraction-Limited Optical Imaging with a Silver Superlens. *Science* 308, 534-537 (2005).
Y. Li et al., On-chip zero-index metamaterials. *Nat Photon* 9, 738-742 (2015).
P. Moitra et al., Realization of an all-dielectric zero-index optical metamaterial. *Nat Photon* 7, 791-795 (2013).
K. Aydin, V. E. Ferry, R. M. Briggs, H. A. Atwater, Broadband polarization-independent resonant light absorption using ultrathin plasmonic super absorbers. *Nature Communications* 2, 517 (2011).
N. Yu et al., Light Propagation with Phase Discontinuities: Generalized Laws of Reflection and Refraction. *Science* 334, 333 (2011).
A. Arbabi, Y. Horie, M. Bagheri, A. Faraon, Dielectric metasurfaces for complete control of phase and polarization with subwavelength spatial resolution and high transmission. *Nat Nano* 10, 937-943 (2015).
A. V. Kildishev, A. Boltasseva, V. M. Shalaev, Planar Photonics with Metasurfaces. *Science* 339 (2013).
D. Lin, P. Fan, E. Hasman, M. L. Brongersma, Dielectric gradient metasurface optical elements. *Science* 345, 298 (2014).
N. Yu, F. Capasso, Flat optics with designer metasurfaces. *Nat Mater* 13, 139-150 (2014).
Z. Li, E. Palacios, S. Butun, K. Aydin, Visible-Frequency Metasurfaces for Broadband Anomalous Reflection and High-Efficiency Spectrum Splitting. *Nano Letters* 15, 1615-1621 (2015).
F. Qin et al., Hybrid bilayer plasmonic metasurface efficiently manipulates visible light. *Science Advances* 2 (2016).
J. Lu, J. Vuckovic, in *Numerical Methods for Metamaterial Design*, K. Diest, Ed. (Springer Netherlands, 2013), vol. 127, chap. 6, pp. 147-173.
J. Lu, J. Vučković, Nanophotonic computational design. *Opt. Express* 21, 13351-13367 (2013).
A. Y. Piggott et al., Inverse design and demonstration of a compact and broadband on-chip wavelength demultiplexer. *Nat. Photonics* 9, 374-378 (2015).
F. Callewaert, S. Butun, Z. Li, K. Aydin, Inverse design of an ultra-compact broadband optical diode based on asymmetric spatial mode conversion. *Scientific Reports* 6, 32577 (2016).
M. Liang et al., A 3-D Luneburg Lens Antenna Fabricated by Polymer Jetting Rapid Prototyping. *IEEE Transactions on Antennas and Propagation* 62, 1799-1807 (2014).
G. Du, M. Liang, R. A. Sabory-Garcia, C. Liu, H. Xin, 3-D Printing Implementation of an X-band Eaton Lens for Beam Deflection. *IEEE Antennas and Wireless Propagation Letters* 15, 1487-1490 (2016).
Z. Wu, J. Kinast, M. E. Gehm, H. Xin, Rapid and inexpensive fabrication of terahertz electromagnetic bandgap structures. *Opt. Express* 16, 16442-16451 (2008).
Z. Wu, W.-R. Ng, M. E. Gehm, H. Xin, Terahertz electromagnetic crystal waveguide fabricated by polymer jetting rapid prototyping. *Opt. Express* 19, 3962-3972 (2011).

* cited by examiner

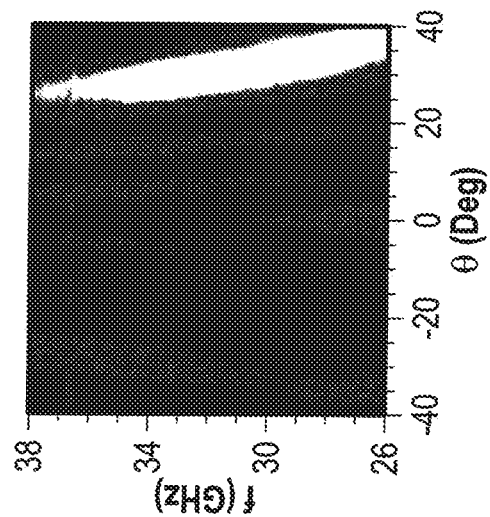
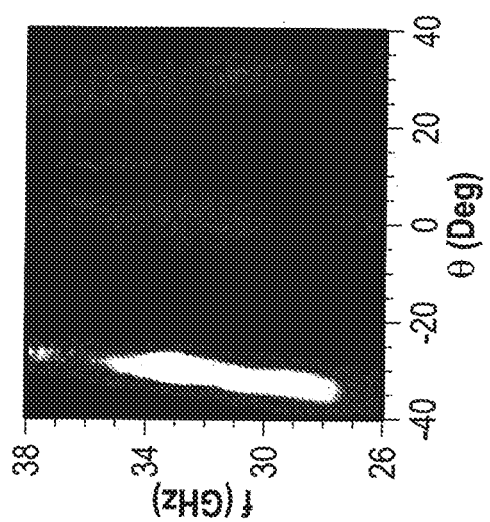
FIG. 2E  FIG. 2G
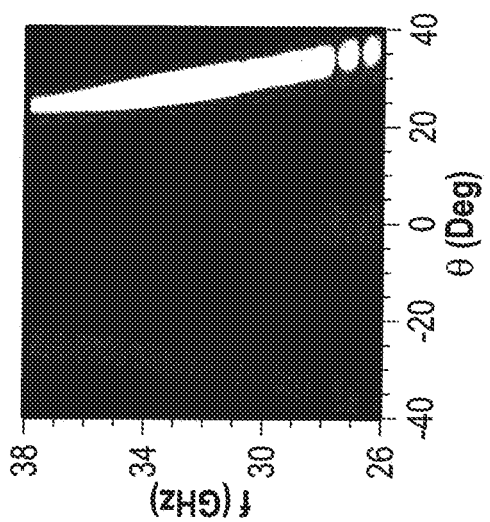
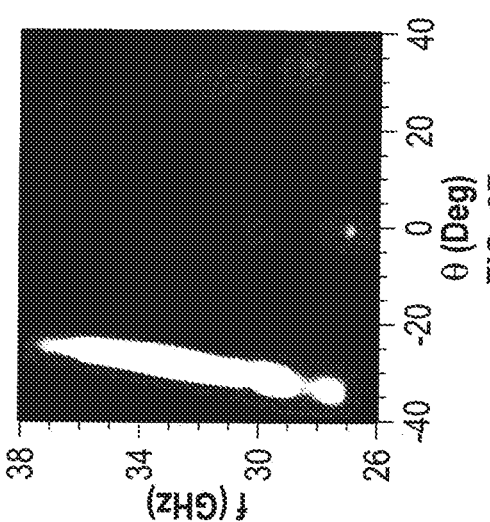
FIG. 2F  FIG. 2H
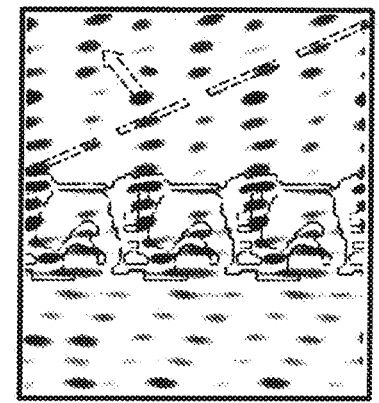
FIG. 2C  FIG. 2D

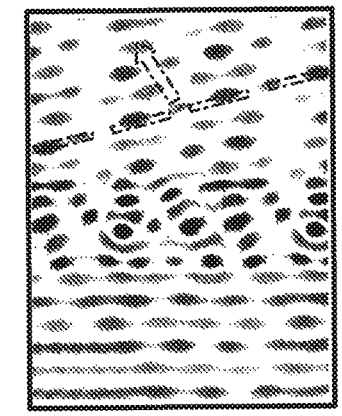
FIG. 4A
FIG. 4B
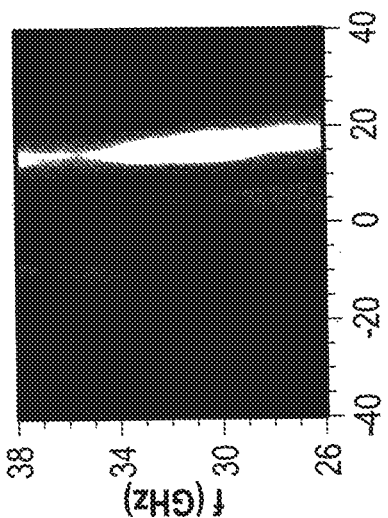
FIG. 4C
FIG. 4D
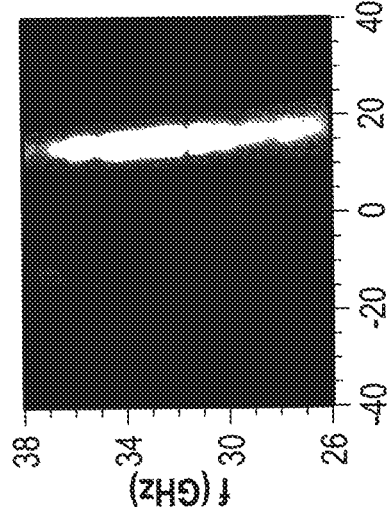
FIG. 4E
FIG. 4F

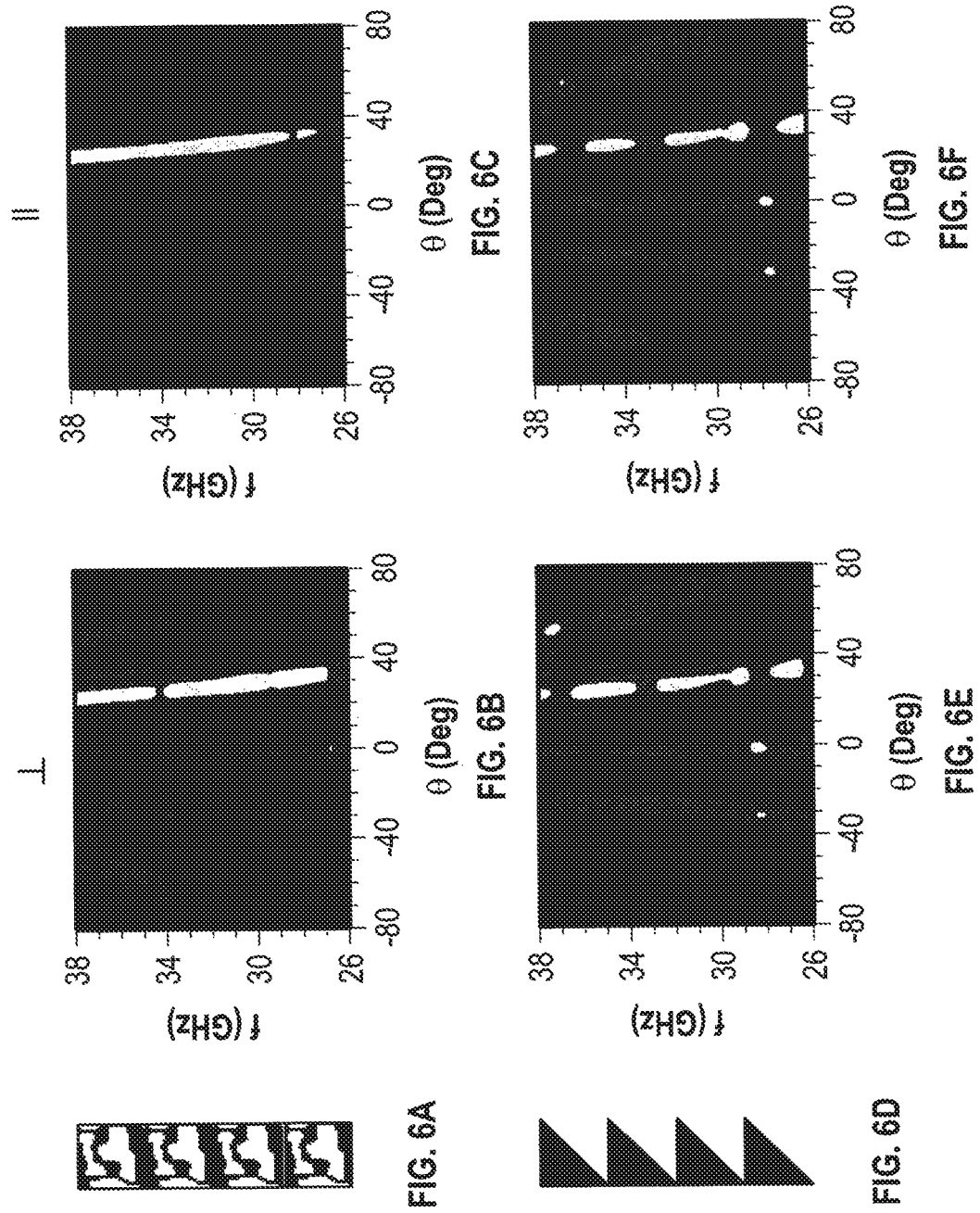

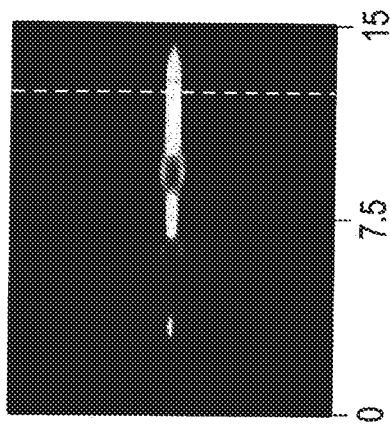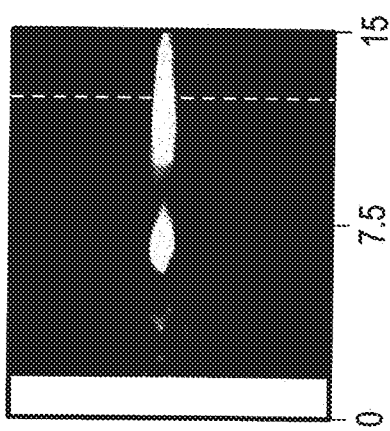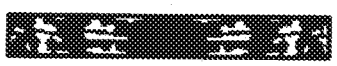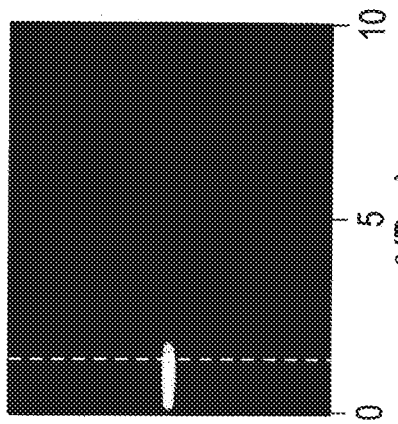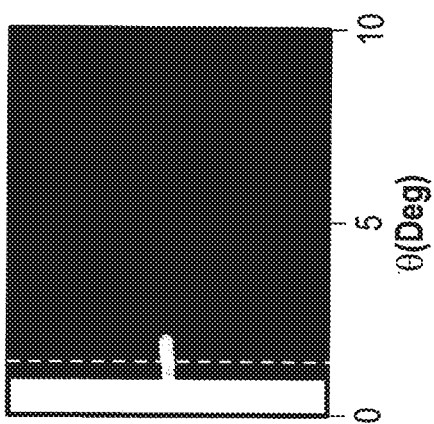
FIG. 7A   FIG. 7B   FIG. 7C   FIG. 7D

ADDITIVE MANUFACTURING OF INVERSE-DESIGNED METADEVICES

CROSS-REFERENCE TO RELATED APPLICATIONS

The present application claims the priority benefit of International Patent Application Number PCT/US2018/039433 filed on Jun. 26, 2018, which claims the priority benefit of U.S. Provisional Patent App. No. 62/524,715 filed on Jun. 26, 2017, the entire disclosures of which are incorporated by reference herein.

BACKGROUND

Metamaterials refer to electromagnetic (EM) materials that are engineered with a sub-wavelength feature size to exhibit different properties than bulk materials. Metadevices are assemblies of metamaterials that are engineered to exhibit specific EM functionalities. Metasurfaces are a specific class of metadevices with a very thin and planar shape. Metasurfaces have the specific property of providing an abrupt phase change to an incoming plane wave, allowing replication of many classical optical functionalities with a much thinner structure. Meta-gratings are another class of metadevices that are periodic. A metalens refers to a metadevice that has the EM functionality of a lens.

SUMMARY

A method for creating metadevices includes receiving, at a computing device, one or more boundary conditions for a metadevice. The method also includes processing, with an inverse-design algorithm stored in a memory of the computing device, the one or more boundary conditions to generate a metadevice structure design that satisfies the one or more boundary conditions. The method also includes converting, by a processor of the computing device, the metadevice structure design into a file that is compatible with an additive manufacturing device. The method further includes providing the file of the metadevice structure design to the additive manufacturing device.

A system for generating metadevices includes a memory configured to store an inverse-design algorithm, an interface configured to receive one or more boundary conditions for a metadevice, and a processor operatively coupled to the memory and the interface. The processor is configured to use the inverse-design algorithm to process the one or more boundary conditions and generate a metadevice structure design that satisfies the one or more boundary conditions. The processor is also configured to convert the metadevice structure design into a file that is compatible with an additive manufacturing device. The processor is also configured to provide the file of the metadevice structure design to the additive manufacturing device.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 2C depicts simulated $H_z$ field amplitudes for parallel polarizations at 33 GHz of the metadevice of FIG. 2A in accordance with an illustrative embodiment.

FIG. 2D depicts simulated $E_z$ field amplitudes for perpendicular polarizations at 33 GHz in accordance with an illustrative embodiment.

FIG. 2E depicts simulated far-field intensity as a function of the output angle and the frequency for parallel polarizations in accordance with an illustrative embodiment.

FIG. 2F depicts simulated far-field intensity as a function of the output angle and the frequency for perpendicular polarizations in accordance with an illustrative embodiment.

FIG. 2G depicts measured far-field intensity as a function of the output angle and the frequency for parallel polarizations in accordance with an illustrative embodiment.

FIG. 2H depicts measured far-field intensity as a function of the output angle and the frequency perpendicular polarizations in accordance with an illustrative embodiment.

FIG. 4A depicts simulated $H_z$ in the 15° polarization splitter of FIG. 3A with a perpendicularly incoming plane wave for parallel polarizations and at a frequency of 33 GHz in accordance with an illustrative embodiment.

FIG. 4B depicts simulated $E_z$ in the 15° polarization splitter with a perpendicularly incoming plane wave for perpendicular polarizations and at a frequency of 33 GHz in accordance with an illustrative embodiment.

FIG. 4C depicts simulated far-field intensity maps as a function of the output angle between −40° and 40° and as a function of the frequency between 26 GHz and 38 GHz for parallel polarizations in accordance with an illustrative embodiment.

FIG. 4D depicts experimental far-field intensity maps as a function of the output angle between −40° and 40° and as a function of the frequency between 26 GHz and 38 GHz for parallel polarizations in accordance with an illustrative embodiment.

FIG. 4E depicts simulated far-field intensity maps as a function of the output angle between −40° and 40° and as a function of the frequency between 26 GHz and 38 GHz for perpendicular polarizations in accordance with an illustrative embodiment.

FIG. 4F depicts experimental far-field intensity maps as a function of the output angle between −40° and 40° and as a function of the frequency between 26 GHz and 38 GHz for perpendicular polarizations in accordance with an illustrative embodiment.

FIGS. 6A-6F show a comparison between the performance of the inverse-designed device (FIGS. 6A-6C) and a blazed grating (FIGS. 6D-6F) optimized to bend electromagnetic radiation by 30° independently of the polarization in accordance with illustrative embodiments.

FIG. 7A depicts a plot of simulated power distribution along the x-y plane for a short-range metalens at 38 GHz in accordance with an illustrative embodiment.

FIG. 7B depicts a plot of simulated power distribution along the x-y plane for a long-range metalens at 38 GHz in accordance with an illustrative embodiment.

FIG. 7C depicts a measured spatial power distribution in the x-y plane for the short-range metalens at 38 GHz in accordance with an illustrative embodiment.

FIG. 7D depicts a measured spatial power distribution in the x-y plane for a long-range lens at 38 GHz in accordance with an illustrative embodiment.

DETAILED DESCRIPTION

Figure 1A:
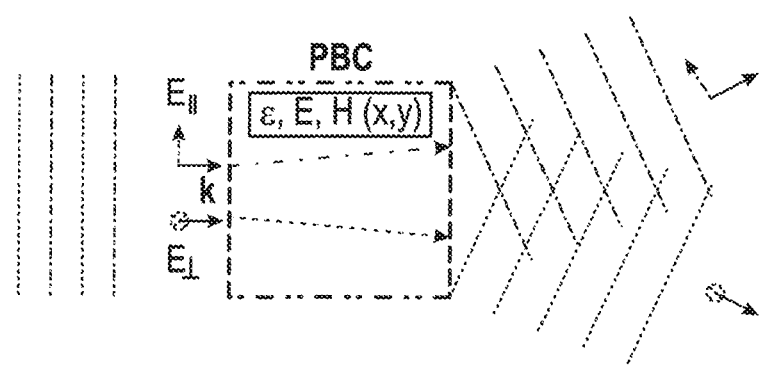
FIG. 1A is a block diagram depicting a polarization splitter in the form of a grating that converts perpendicularly incoming plane waves with parallel and perpendicular polarizations into two different diffraction orders in accordance with an illustrative embodiment.

Described herein is a platform for the design and fabrication of high efficiency dielectric metadevices. The metadevices are designed by way of inverse electromagnetic design computational methods, and in one embodiment the metadevices are fabricated using additive manufacturing. The metadevices described herein are designed to provide complete control of the phase and the polarization of an incident wave. In particular, the embodiments described herein can be used to create millimeter-wave frequency metadevices that perform polarization splitting, beam bending, and focusing with high efficiency over a broad range of wavelength range. The methods described herein are scalable and can also be extended for the design and fabrication of electromagnetic and photonic metadevices spanning microwave to optical frequencies.

Conventional optical elements that control the polarization, phase, and amplitude of electromagnetic (EM) radiation include lenses, polarizers, beamsplitters, and mirrors. Such optical elements are typically engineered at a scale larger than the wavelength. Within the last two decades, a significant amount of research has been devoted to understanding light-matter interactions, designing novel materials, and designing electromagnetic devices with subwavelength feature sizes. Metamaterials, and more generally materials composed of nanostructures with subwavelength feature size, have emerged as a viable platform to manipulate electromagnetic radiation in an unconventional manner.

In particular, photonic crystals and negative-index materials are used to achieve sub-diffraction lensing. More recently, metasurfaces have gained substantial interest due to their ability to perform optical functionalities such as lensing, holograms, and beam shaping within an extremely thin layer.

Metasurfaces are formed of discrete subwavelength resonant elements arranged in a specific manner to impart a desired global phase change to an incoming electromagnetic wave. Using subwavelength thick metasurfaces to control phase, amplitude, and polarization is a promising route towards building miniature optical devices. However, existing design and fabrication methods suffer from several drawbacks prohibiting the potential of using metasurfaces to replace conventional bulk optical elements. Initial metasurface designs utilized plasmonic metals that exhibited high optical losses, leading to relatively low efficiency. Additionally, although metals can be replaced with high-index dielectric materials such as silicon, such metasurfaces often rely on Mie-type resonances that result in a narrow wavelength operation range.

Typically, metasurface design starts with identification of an optical resonator with a well-defined geometrical shape, such as a triangle, rectangle, ellipse, V-antenna, etc. Phase information is then calculated for various geometrical parameters such as radius, width, orientation, etc. However, metadevices which are based on traditionally designed ultra-thin metasurfaces often yield polarization dependency and narrowband optical response, as their design relies on subwavelength optical resonators.

Described herein is an inverse electromagnetic design method to form high-efficiency (e.g., >60%), broadband (e.g., $\Delta \lambda / \lambda$ >25%, where $\lambda$ is wavelength), dielectric-based thin (e.g., ≤2$\lambda$) electromagnetic metadevices overcoming the aforementioned limitations of traditional metadevices. In alternative embodiments, the efficiency value, broadband value, and/or thickness of metadevices described herein may differ from the values identified above. The metadevices created using the processes described herein can be non-resonant structures which have a very broad response as compared with traditional devices. Also, the metadevices described herein can allow manipulation of light/radiation in plane.

Inverse-design refers to the use of an algorithm to design different types of devices. Inverse-design algorithms include objective-first algorithms, topology optimization algorithms, brute force algorithms, genetic algorithms, etc. The present description focuses primarily on objective-first inverse design, but the embodiments disclosed herein are not so limited and other types of inverse-design may also be used. By using an optimization algorithm that is coupled with an electromagnetic simulation, a complex dielectric structure that provides a desired phase change distribution for a desired optical functionality can be designed. As used herein, inverse-design refers to a process in which a computing system computationally designs a device based on a set of functionalities that one wants the device to achieve. In the context of metadevices, a set of electromagnetic input and output values is designated, and the computing system designs a metadevice that satisfies those values.

As discussed herein, the inventors have also identified benefits to using an additive manufacturing process, such as 3D printing, to create optical metadevices that are designed using an inverse design methodology. The use of such additive manufacturing allows creation of devices which cannot be fabricated using traditional removal techniques such as milling. In one embodiment, the 3D-printed devices can be made of high impact polystyrene (HIPS) and fabricated with a consumer 3D-printer based on fused deposition modeling. In alternative embodiments, a different fabrication material and/or technique may be used. The HIPS material has low cost and very low attenuation in the microwave and millimeter-wave wavelengths, with a loss-tangent measured to be tan δ<0.003 over the 26-38 GHz band. The real part of the dielectric constant of HIPS was $\varepsilon' \approx 2.3$ ($n \approx 1.52$) in this band, which can be used as a constraint in the inverse-design algorithm to design binary devices made of air ($\varepsilon=1$) and HIPS ($\varepsilon=2.3$). Because of the low index, the phase between the input and output is approximately proportional to the effective thickness of the polymer. Therefore, in order to allow a $2\pi$ phase shift between a part full of polymer and a part full of air, the device thickness should obey Equation 1 below. In this particular embodiment, Equation 1 indicates that the thickness of the metadevices should be slightly larger than $2\lambda$.

$$\Delta \phi = 2\pi (n-1) \frac{t}{\lambda} = 2\pi \times 0.52 \times \frac{t}{\lambda} \geq 2\pi \qquad \text{Equation 1}$$

In order to test the electromagnetic properties of the created metadevices, a vector network analyzer (VNA) can be used to generate an input signal transmitted through a high-gain horn antenna placed far away from the sample (distance>100$\lambda$) in order to produce a plane wave perpendicularly incident to the input surface. The metadevice is surrounded by radar absorbing material to prevent the signal from going around it. For the polarization splitters and beam bending metadevices, the transmitted power was measured in the far-field (>100$\lambda$) with a low gain horn antenna as a function of the angle between −40° and 40° by 2° steps, and as a function of the frequency between 26 GHz (11.5 mm) and 38 GHz (7.9 mm). For the created metalenses, the transmitted power can be measured in the near-field with a probe antenna scanned in the x-y plane at the output of the devices. The results of the measurements taken from actual metadevices created in accordance with the embodiments described herein are discussed below with reference to the figures.

The design, fabrication, and characterization of ~$\lambda$ thick metadevices for bending, polarization splitting, and focusing of EM radiation at millimeter-wave frequencies are demonstrated herein. The methodologies can, however, be used to create a number of different metadevices, including devices operating in near-infrared for telecommunications, devices operating in mid/long-infrared and THz for chemical sensing and IR imaging, devices operating microwave and millimeter wave for wireless communications and military applications, dielectric antennas with low loss optimized for specific beam shaping between near-infrared and millimeter waves, ultra-thin lenses for beam focusing in the near-filed, polarization splitters, wavelength separators, on-chip control of light propagation (near-IR), passive optical devices for THz radiation, etc.

Figure 1B:
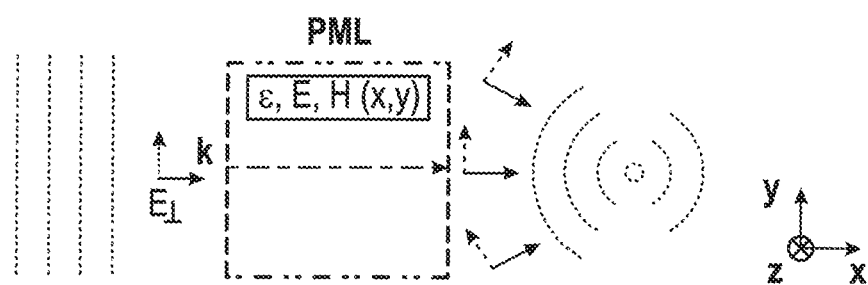
FIG. 1B is a block diagram depicting a flat metalens device that focuses a plane wave onto a cylindrical wave at a chosen focal point in accordance with an illustrative embodiment.

FIGS. 1A and 1B are schematics for an illustrative inverse electromagnetic design approach for designing free-space metadevices. More specifically, FIG. 1A is a block diagram depicting a free-space polarization splitter meta-grating that bends parallel and perpendicular polarizations to opposite diffraction orders in accordance with an illustrative embodiment. The design and fabrication processes described herein can also be used to create a meta-grating that bends both polarizations to the same diffraction order. FIG. 1B is a block diagram depicting a flat metalens device that focuses a plane wave onto a cylindrical wave at a chosen focal point in accordance with an illustrative embodiment. As discussed in more detail below, the desired optical functionality of the metadevices is defined as a set of input and output conditions at the boundaries of the design space.

As part of the inverse design process, the objective-first algorithm can be used, and the electromagnetic wave equation is treated as an optimization problem. The electric field, E and the dielectric permittivity, ε, can be solved for using Eq. 2 below, based on a desired input and output electromagnetic field distribution.

$$\min_{\varepsilon,E} \nabla \times \nabla \times E - w^2 \varepsilon E \qquad \text{Equation 2}$$

Such an optimization problem is non-convex. Therefore, there is no general method to find the optimum solution. However, suitable solutions that satisfy desired functionality with acceptable performance can be reached. An on-chip wavelength splitter and an optical diode have been successfully demonstrated using such an inverse electromagnetic design approach.

Bending and polarization splitting are achieved with meta-gratings that convert an input plane wave to an output plane wave with a different diffraction order than m=0, with periodic boundary conditions along the x-axis. For metalenses, one goal is to focus a plane wave at a desired focal length. Thus, in one embodiment, the output is chosen to be a cylindrical wave centered at a specific location. Metalenses do not perform like a grating. Thus, in the case of metalenses, the boundary conditions are set to be a Perfectly Matched Layer (PML) along the x direction. In one embodiment, the inverse design described herein is two-dimensional, and it is therefore assumed that metadevices have infinite height along the z axis. In practice, the fabricated devices are ≈10$\lambda$ thick. However, in alternative embodiments, different thicknesses may be used such as 5$\lambda$, 7$\lambda$, 12$\lambda$, etc.

Inverse-designed metadevices are realized using additive manufacturing, which is commonly referred to as 3D-printing. This bottom-up approach allows the fabrication of complex devices with high aspect ratio. Furthermore, 3D-printing is a scalable method, with resolutions ranging from ~100 nm to 1 ~mm or larger, allowing the fabrication of electromagnetic devices with applications from visible light to millimeter waves and microwaves. As a result, the proposed devices described herein can be practically realized for microwave and millimeter waves with polymer-based 3D-printing.

Figure 2A:
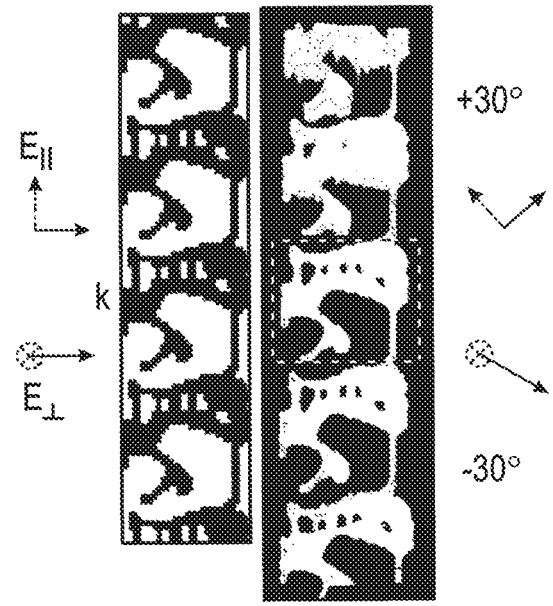
FIG. 2A depicts a free-space polarization splitter operational at millimeter-wave wavelengths in accordance with an illustrative embodiment.

FIG. 2A depicts a free-space polarization splitter operational at millimeter-wave wavelengths in accordance with an illustrative embodiment. More specifically, FIG. 2A depicts a schematic drawing (left) and a top-view photograph (right) of a 3D printed 30° polarization splitter. The photograph (right) of the 3D-printed metadevice shown next to the computer-generated pattern (left) in FIG. 2A illustrates the high fidelity of the 3D-printing process. The dashed line rectangle of FIG. 2A indicates a unit cell of the grating. The metadevice of FIG. 2A deflects a normal incident planewave polarized along the y (parallel) and z (perpendicular) directions into m=+1 and m=−1 diffraction orders, respectively, with high efficiency and over a broad bandwidth. With respect to design parameters, the metadevice of FIG. 2A was assumed to be periodic in the y-direction and infinite along the z direction. The width of the metadevice was chosen to be ~2$\lambda$, but can be different in alternative embodiments. The periodicity, L, along they axis was determined by the deflection angle θ of the desired diffraction order m (here, m=±1 for all devices), following the grating equation L sin θ=m$\lambda$. The metadevice was designed and optimized for an operation frequency of 33 GHz, $\lambda$=9.1 mm, and a deflection angle of θ=±30°, for which L=1.8 cm. The inverse-design algorithm generated a binary refractive index distribution of dielectric and air that was then printed with dimensions of 2 cm×7.2 cm×8 cm.

Figure 2B:
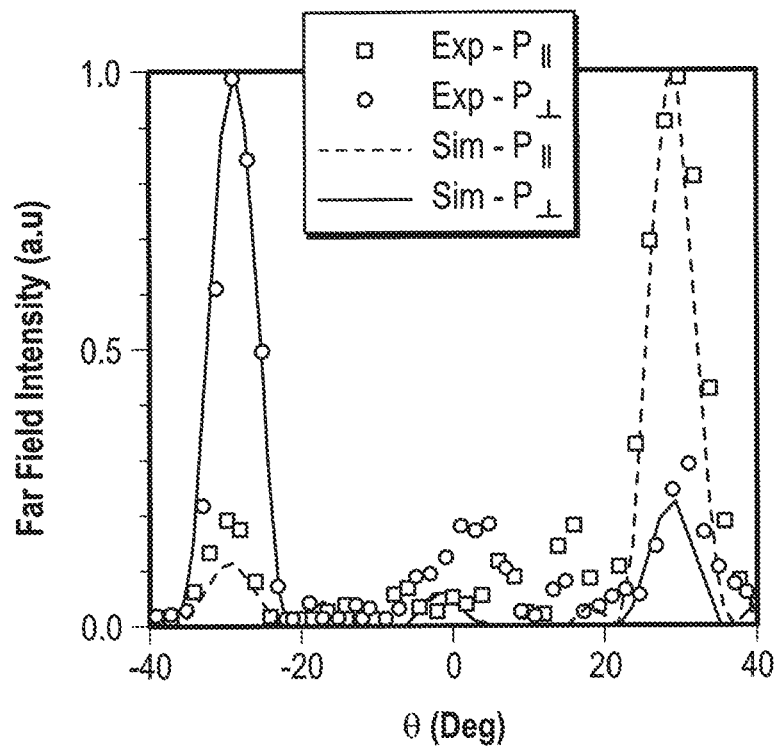
FIG. 2B depicts plots of simulated power distribution and measured power distribution at 33 GHz for the metadevice of FIG. 2A in accordance with an illustrative embodiment.

Far-field angular transmission through the actual metadevice of FIG. 2A was measured to verify predicted polarization splitting behavior. FIG. 2B depicts plots of simulated power distribution and measured power distribution at 33 GHz in accordance with an illustrative embodiment. In FIG. 2B, dashed lines represent simulated values and circles represent measured values of far-field power as a function of deflection angle for both polarizations. In the metadevice of FIG. 2A, a plane wave with parallel polarization was observed to bend at an angle of θ32 +30°, whereas perpendicular polarization was deflected with an angle of θ=−30°. The total power transmitted by the metadevice at 33 GHz was measured to be 76% for the parallel polarization and 54% for the perpendicular polarization, which is lower than the simulated values of 90% due to structural imperfections. The rejection ratio, defined as the ratio between the peak intensity and the maximum intensity outside the main peak, was experimentally found to be 5.2 dB and 7.0 dB for parallel and perpendicular polarizations, respectively, which is close to the simulation values of 6.6 dB and 9.3 dB, respectively.

Full-field electromagnetic simulations were performed to calculate the electromagnetic properties of the metadevice of FIG. 2A. FIG. 2C depicts simulated $H_z$ field amplitudes for parallel polarizations at 33 GHz in accordance with an illustrative embodiment. FIG. 2D depicts simulated $E_z$ field amplitudes for perpendicular polarizations at 33 GHz in accordance with an illustrative embodiment. Spatial electromagnetic field distribution provides a clear picture of how the EM wave propagates inside the metadevice. For example, the metadevice of FIG. 2A presents a dielectric filling fraction gradient along the y-direction between a part mostly filled with dielectric (ε=2.3), where the phase was shifted by 6π, and a part mostly void (ε=1.0) where the phase was shifted by only 4π, allowing a 2π phase shift in the y-direction. The polarization splitting was a result of the different phase change response of the different polarizations resulting from the complex dielectric shape of the device.

Although 33 GHz was chosen to be the optimum frequency with highest efficiency in the inverse-design algorithm, broad operation bandwidth was observed that spanned the entire measurement range, which was enabled by the inverse-design method favoring non-resonant dielectric structures. As such, in alternative embodiments, different frequencies may be used to design metadevices in accordance with the inverse-design algorithm. FIG. 2E depicts simulated far-field intensity as a function of the output angle and the frequency for parallel polarizations in accordance with an illustrative embodiment. FIG. 2F depicts simulated far-field intensity as a function of the output angle and the frequency for perpendicular polarizations in accordance with an illustrative embodiment. FIG. 2G depicts measured far-field intensity as a function of the output angle and the frequency for parallel polarizations in accordance with an illustrative embodiment. FIG. 2H depicts measured far-field intensity as a function of the output angle and the frequency perpendicular polarizations in accordance with an illustrative embodiment. As illustrated, the simulations and measurements agreed well, apart from minor differences that can be explained by the finite number of periods in the printed structures as well as an imperfect plane wave input.

Figure 3A:
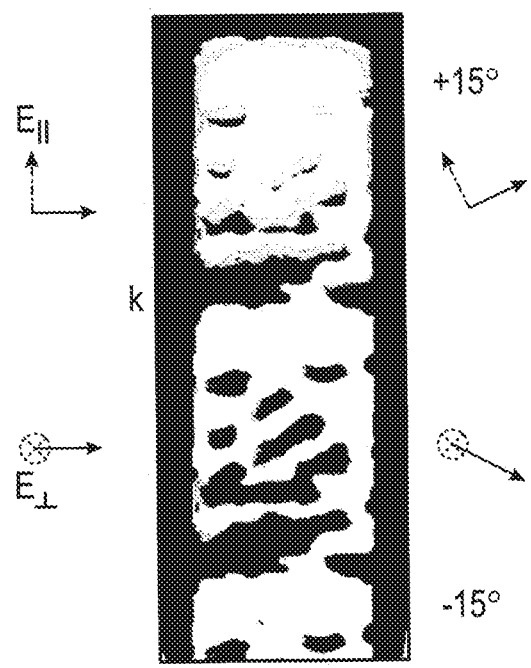
FIG. 3A depicts a 15° polarization splitter as a function of the output angle for a frequency of 33 GHz in accordance with an illustrative embodiment.
Figure 3B:
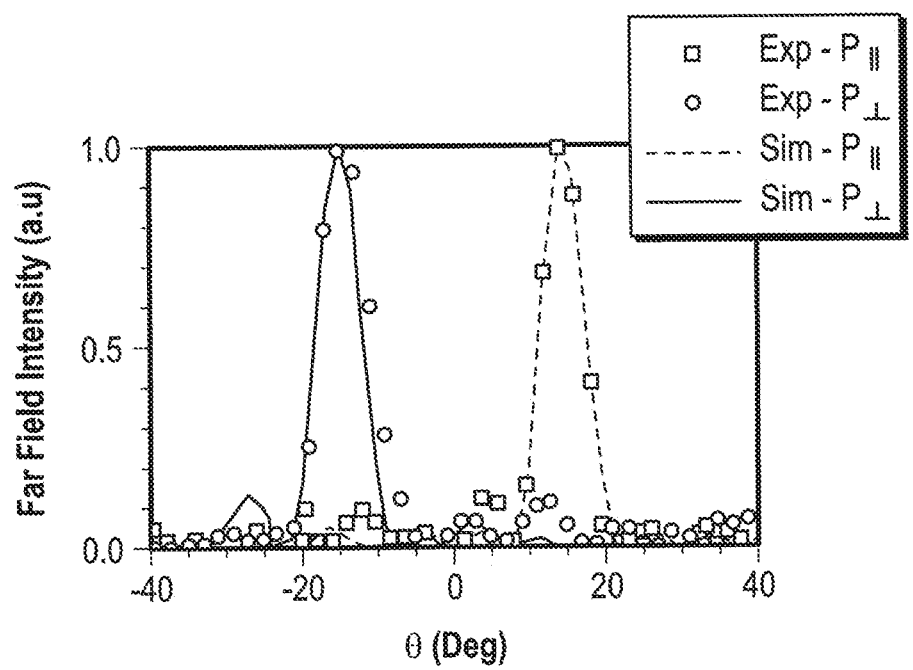
FIG. 3B depicts simulated (dashed lines) and experimental (circles) far-field intensity of the 15° polarization splitter of FIG. 3A as a function of the output angle for a frequency of 33 GHz in accordance with an illustrative embodiment.

In order to demonstrate the versatility and flexibility of the inverse-design approach, two additional metadevices that bend millimeter-waves were designed and fabricated. FIG. 3A depicts a polarization splitter with a 15° bending angle as a function of the output angle for a frequency of 33 GHz in accordance with an illustrative embodiment. Similar to the 30° splitter, the metadevice of FIG. 3A presents a gradient of dielectric filling fraction along the y-direction with a larger periodicity (L=3.5 cm) to favor a smaller bending angle. FIG. 3B depicts simulated (dashed lines) and experimental (circles) far-field intensity of the 15° polarization splitter of FIG. 3A as a function of the output angle for a frequency of 33 GHz in accordance with an illustrative embodiment. The measured rejection ratios for the 15° splitter are 8.2 dB and 10.6 dB for parallel and perpendicular polarizations, respectively.

The designs, simulated fields, and broadband far-field data of the metadevice of FIG. 3A are depicted in FIG. 4. In the case of perpendicular polarization, a wave propagating along the y-direction was created in the metadevice, changing its behavior compared to parallel polarization. For example, FIG. 4A depicts simulated $H_z$ in the 15° polarization splitter with a perpendicularly incoming plane wave for parallel polarizations and at a frequency of 33 GHz in accordance with an illustrative embodiment. FIG. 4B depicts simulated $E_z$ in the 15° polarization splitter with a perpendicularly incoming plane wave for perpendicular polarizations and at a frequency of 33 GHz in accordance with an illustrative embodiment. FIG. 4C depicts simulated far-field intensity maps as a function of the output angle between −40° and 40° and as a function of the frequency between 26 GHz and 38 GHz for parallel polarizations in accordance with an illustrative embodiment. FIG. 4D depicts experimental far-field intensity maps as a function of the output angle between −40° and 40° and as a function of the frequency between 26 GHz and 38 GHz for parallel polarizations in accordance with an illustrative embodiment. FIG. 4E depicts simulated far-field intensity maps as a function of the output angle between −40° and 40° and as a function of the frequency between 26 GHz and 38 GHz for perpendicular polarizations in accordance with an illustrative embodiment. FIG. 4F depicts experimental far-field intensity maps as a function of the output angle between −40° and 40° and as a function of the frequency between 26 GHz and 38 GHz for perpendicular polarizations in accordance with an illustrative embodiment.

Figure 3C:
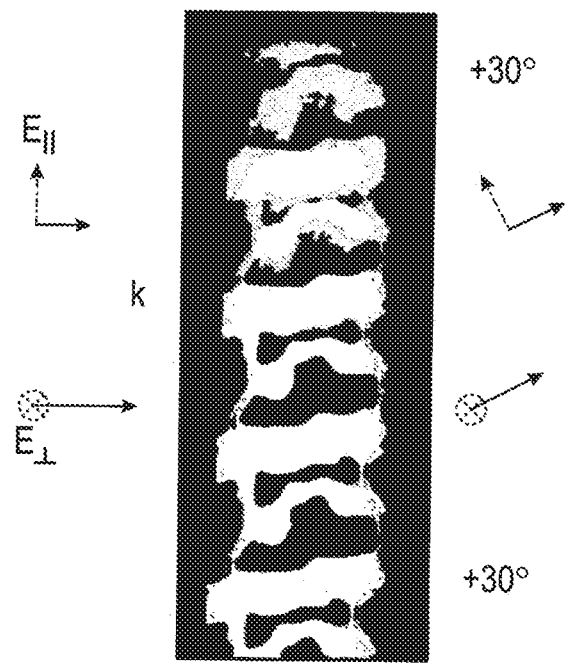
FIG. 3C depicts a polarization-independent wave bending metadevice having a 30° bend as a function of the output angle for a frequency of 33 GHz in accordance with an illustrative embodiment.
Figure 3D:
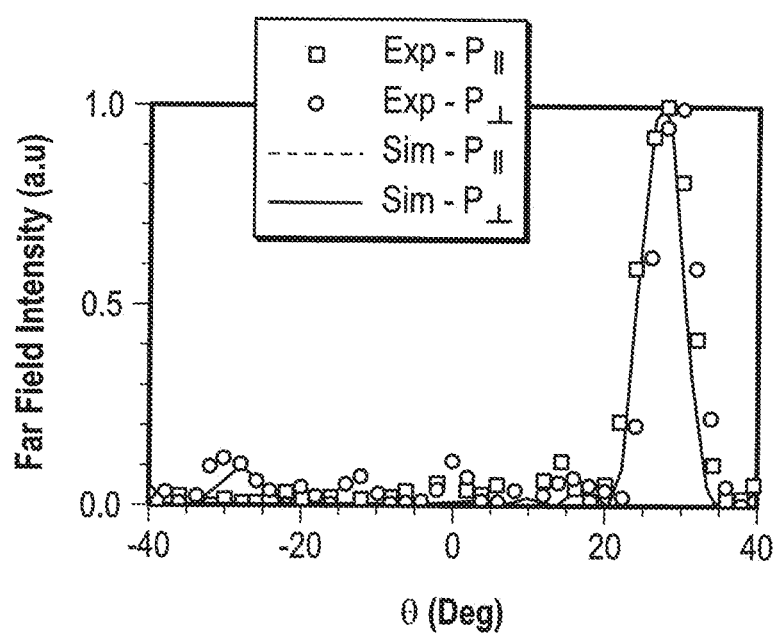
FIG. 3D depicts simulated (dashed lines) and experimental (circles) far-field intensity of the 30° bend polarization-independent beam bending metadevice as a function of the output angle for a frequency of 33 GHz in accordance with an illustrative embodiment.
Figure 5C:
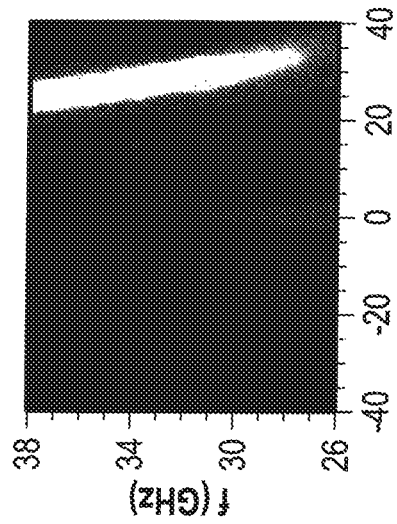
FIG. 5C depicts simulated far-field intensity maps as a function of the output angle between −40° and 40° and as a function of the frequency between 26 GHz and 38 GHz for parallel polarizations of the metadevice of FIG. 3C, in accordance with an illustrative embodiment.
Figure 5D:
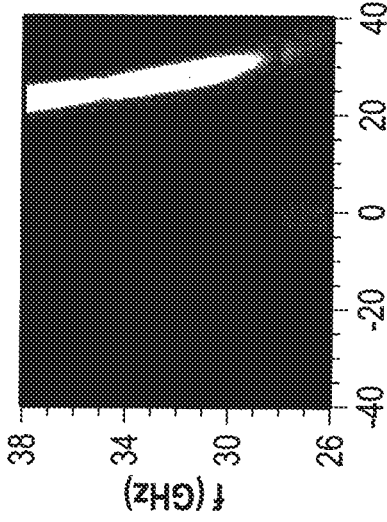
FIG. 5D depicts experimental far-field intensity maps as a function of the output angle between −40° and 40° and as a function of the frequency between 26 GHz and 38 GHz for parallel polarizations in the metadevice of FIG. 3C, in accordance with an illustrative embodiment.
Figure 5A:
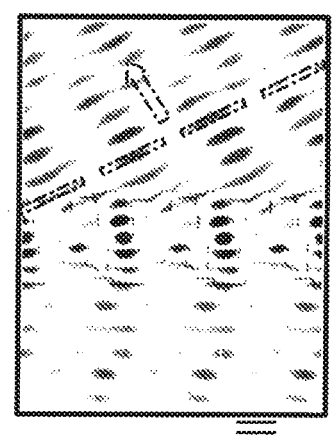
FIG. 5A depicts simulated $H_z$ in the polarization-independent wave bending metadevice of FIG. 3C, with a perpendicularly incoming plane wave for parallel polarizations and at a frequency of 33 GHz in accordance with an illustrative embodiment.
Figure 5E:
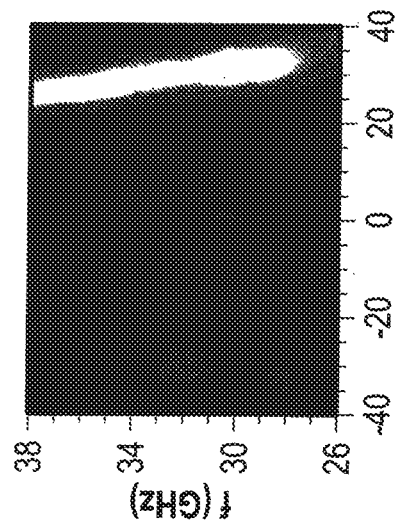
FIG. 5E depicts simulated far-field intensity maps as a function of the output angle between −40° and 40° and as a function of the frequency between 26 GHz and 38 GHz for perpendicular polarizations in the metadevice of FIG. 3C, in accordance with an illustrative embodiment.
Figure 5F:
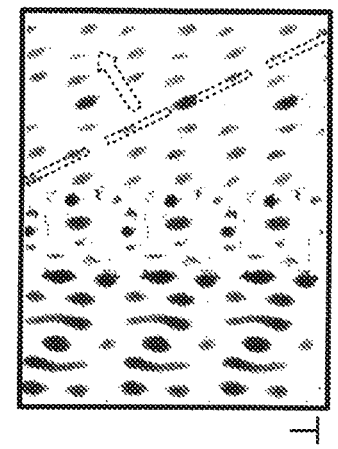
FIG. 5F depicts experimental far-field intensity maps as a function of the output angle between −40° and 40° and as a function of the frequency between 26 GHz and 38 GHz for perpendicular polarizations in the metadevice of FIG. 3C, in accordance with an illustrative embodiment.
Figure 5B:
FIG. 5B depicts simulated $E_z$ in the metadevice of FIG. 3C with a perpendicular incoming plane wave for perpendicular polarizations and at a frequency of 33 GHz in accordance with an illustrative embodiment.

In addition to a polarization beam-splitter, a polarization-independent millimeter-wave bending metadevice was also designed and realized, in which both polarizations are bent to the same diffraction order. FIG. 3C depicts a polarization-independent wave bending metadevice having a 30° bend as a function of the output angle for a frequency of 33 GHz in accordance with an illustrative embodiment. FIG. 3D depicts simulated (dashed lines) and experimental (circles) far-field intensity of the 30° bend polarization-independent beam bending metadevice as a function of the output angle for a frequency of 33 GHz in accordance with an illustrative embodiment. As indicated in FIG. 3D, the results show very good agreement between theory and experiment.

The designs, simulated fields, and broadband far-field data for the polarization-independent wave bending metadevice of FIG. 3C are shown in FIG. 5. Specifically, FIG. 5A depicts simulated $H_z$ in the polarization-independent wave bending metadevice of FIG. 3C, with a perpendicularly incoming plane wave for parallel polarizations and at a frequency of 33 GHz in accordance with an illustrative embodiment. FIG. 5B depicts simulated $E_z$ in the metadevice of FIG. 3C with a perpendicular incoming plane wave for perpendicular polarizations and at a frequency of 33 GHz in accordance with an illustrative embodiment. FIG. 5C depicts simulated far-field intensity maps as a function of the output angle between −40° and 40° and as a function of the frequency between 26 GHz and 38 GHz for parallel polarizations of the metadevice of FIG. 3C, in accordance with an illustrative embodiment. FIG. 5D depicts experimental far-field intensity maps as a function of the output angle between −40° and 40° and as a function of the frequency between 26 GHz and 38 GHz for parallel polarizations in the metadevice of FIG. 3C, in accordance with an illustrative embodiment. FIG. 5E depicts simulated far-field intensity maps as a function of the output angle between −40° and 40° and as a function of the frequency between 26 GHz and 38 GHz for perpendicular polarizations in the metadevice of FIG. 3C, in accordance with an illustrative embodiment. FIG. 5F depicts experimental far-field intensity maps as a function of the output angle between −40° and 40° and as a function of the frequency between 26 GHz and 38 GHz for perpendicular polarizations in the metadevice of FIG. 3C, in accordance with an illustrative embodiment.

Although polarization-independent bending of EM radiation can be achieved with a triangular blazed grating, it has been demonstrated that such gratings deflect a significant amount of power to the higher diffraction orders. On average, from 26 to 38 GHz, the inverse-designed metadevices reduce the amount of power sent into undesired diffraction orders by a factor of 2.8 for parallel polarization and 2.0 for perpendicular polarization, when compared to a blazed grating with similar thickness. FIGS. 6A-6F show a comparison between the performance of the inverse-designed device (FIGS. 6A-6C) and a blazed grating (FIGS. 6D-6F) optimized to bend electromagnetic radiation by 30° independently of the polarization in accordance with illustrative embodiments. The simulated far-field intensities are represented for angles from −80° to 80° and for frequencies from 26 GHz to 38 GHz for perpendicular polarizations (FIGS. 6B and 6E) and parallel polarizations (FIGS. 6C and 6F). As can be seen, the inverse-designed metadevice transmits a much lower power to undesired grating orders (23% for perpendicular polarization and 18% for parallel polarization) than the blazed grating (47% for perpendicular polarization and 51% for parallel polarization). Simulated rejection ratios at 32 GHz are 10.1 dB (perpendicular polarization) and 12.4 dB (parallel polarization) for the inverse-designed bend, compared to 6.6 dB (perpendicular polarization) and 3.8 dB (parallel polarization) for the triangular grating.

Flat metalenses can also be designed using the inverse-design algorithm described herein. Such metalenses are used to focus an incoming plane wave onto a focal point, as depicted in FIG. 1B. Two different metalenses were designed and fabricated with focal lengths 2$\lambda$ and 15$\lambda$ away from the surface of the device. Both lenses were optimized and scaled for operation around 38 GHz ($\lambda$=7.9 mm). The first metalens was 1.5 cm wide and 10 cm long, the second metalens was 2.5 cm wide and 15 cm long, and both metalenses were 10 cm tall. In alternative embodiments, different focal lengths, operating frequency, and/or dimensions may be used to create metalenses.

FIG. 7 shows a depiction of each metalens and the corresponding computer-generated design in accordance with an illustrative embodiment. The electromagnetic behavior of both metalens devices was simulated with a perpendicularly polarized incoming plane wave. FIG. 7A depicts a plot of simulated power distribution along the x-y plane for a short-range metalens at 38 GHz in accordance with an illustrative embodiment. FIG. 7B depicts a plot of simulated power distribution along the x-y plane for a long-range metalens at 38 GHz in accordance with an illustrative embodiment. A 2D scan of the transmitted power was performed after the metalenses were used, using a millimeter-wave probe antenna positioned at z=5 cm. FIG. 7C depicts a measured spatial power distribution in the x-y plane for the short-range metalens in accordance with an illustrative embodiment. FIG. 7D depicts a measured spatial power distribution in the x-y plane for a long-range lens in accordance with an illustrative embodiment. Simulated and measured spatial intensity distribution for the metalenses closely matched, with small discrepancies due to the imperfect plane wave input, and minor differences between the ideal designs and the fabricated devices. As expected, the first metalens device focused EM radiation 1.5 cm (~2 $\lambda$) away from the device while the second metalens device had a focal point located 12 cm (~15 $\lambda$) away, with theoretical numerical apertures (NA) of 0.82 and 0.53, respectively. The full-width-at-half-maximum (FWHM) of both devices were, respectively, 0.5 cm and 1.1 cm, which corresponds to practical NA of 0.8 and 0.36, respectively. These values are close to the theoretical values. The metalens devices showed broadband focusing behavior from 28 GHz to 40 GHz.

Figure 7E:
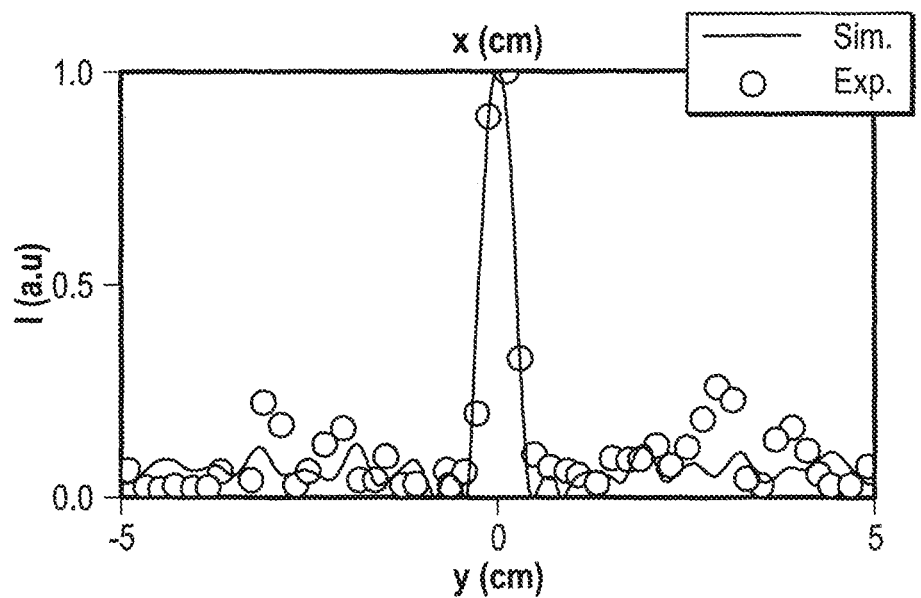
FIG. 7E shows a cross-section of the simulated (lines) and measured (circles) power along the white dashed lines on the maps for the first lens in accordance with an illustrative embodiment.
Figure 7F:
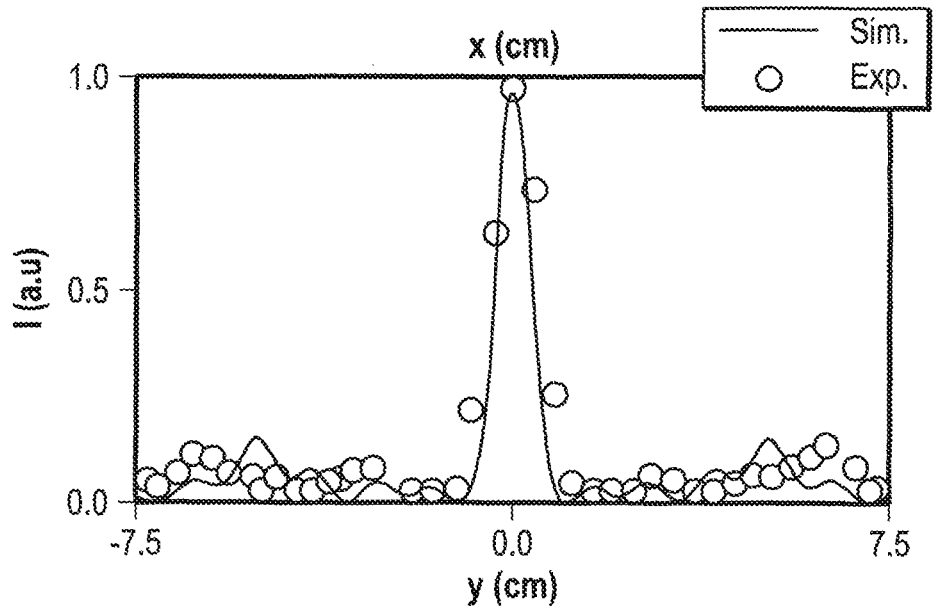
FIG. 7F shows a cross-section of the simulated (lines) and measured (circles) power along the white dashed lines on the maps for the second lens in accordance with an illustrative embodiment.

In FIGS. 7A and 7C, the input plane wave is generated by a horn antenna 1 m away on the left of the device while the output is measured with a probe antenna scanned along a 9×10 cm x-y plane for the first lens. In FIGS. 7B and 7D, the input plane wave is generated by a horn antenna 1 m away on the left of the device while the output is measured with a probe antenna scanned along a 14×15 cm plane for the second lens. Schematics and a picture of the 3D-printed metalenses are shown next to the simulated and experimental maps, respectively. FIG. 7E shows a cross-section of the simulated (lines) and measured (circles) power along the white dashed lines on the maps for the first lens in accordance with an illustrative embodiment. FIG. 7F shows a cross-section of the simulated (lines) and measured (circles) power along the white dashed lines on the color maps for the second lens in accordance with an illustrative embodiment.

Figure 8A:
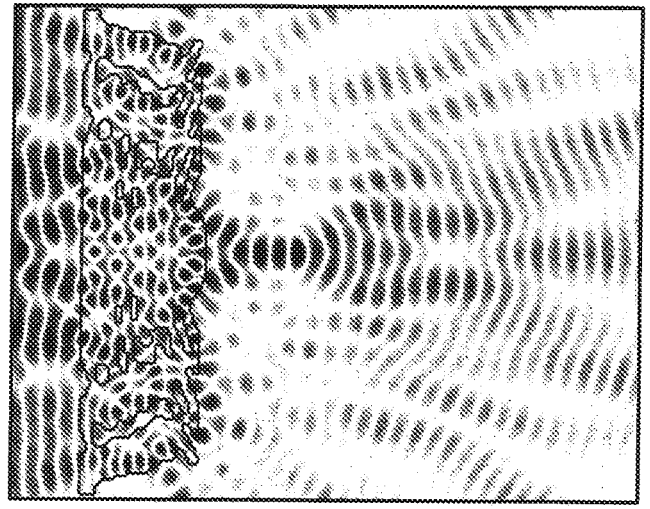
FIG. 8A depicts a simulated $E_z$ field amplitude map along the x-y plane at a frequency of 38 GHz, with the black lines showing the contour of the first metalens in accordance with an illustrative embodiment.
Figure 8B:
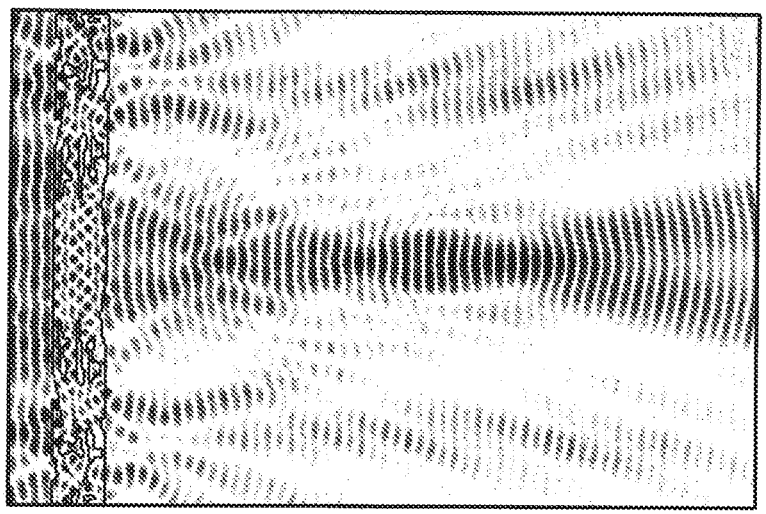
FIG. 8B depicts a simulated $E_z$ field amplitude map along the x-y plane at a frequency of 38 GHz, with the black lines showing the contour of the second metalens in accordance with an illustrative embodiment.
Figure 9A:
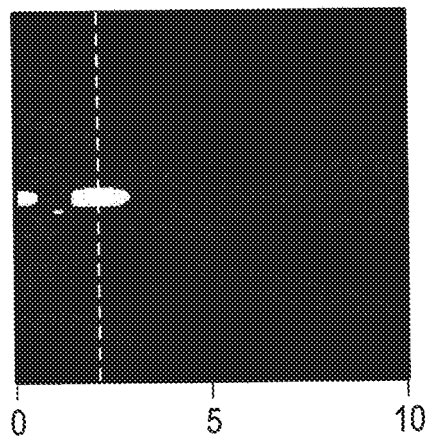
FIG. 9A depicts simulated electromagnetic power maps along the x-y plane at the output of the first metalens at a frequency of 30 GHz in accordance with an illustrative embodiment.
Figure 9B:
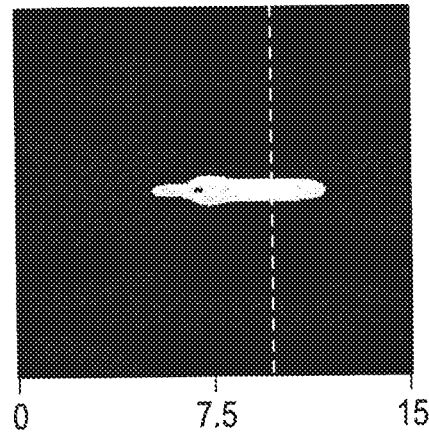
FIG. 9B depicts simulated electromagnetic power maps along the x-y plane at the output of the second metalens at a frequency of 30 GHz in accordance with an illustrative embodiment.
Figure 9C:
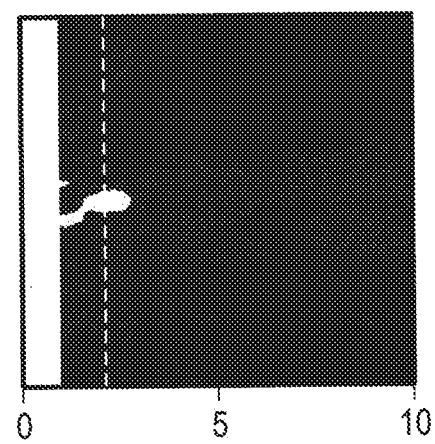
FIG. 9C depicts experimental electromagnetic power maps along the x-y plane at the output of the first metalens at a frequency of 30 GHz in accordance with an illustrative embodiment.
Figure 9D:
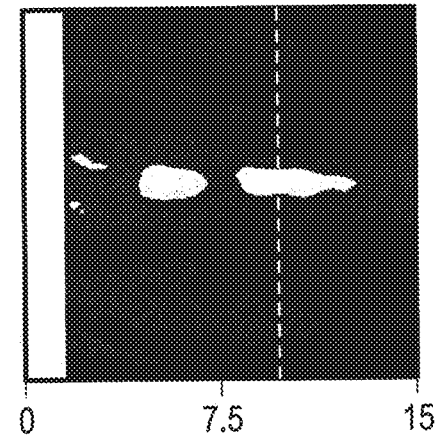
FIG. 9D depicts experimental electromagnetic power maps along the x-y plane at the output of the second metalens at a frequency of 30 GHz in accordance with an illustrative embodiment.
Figure 9E:
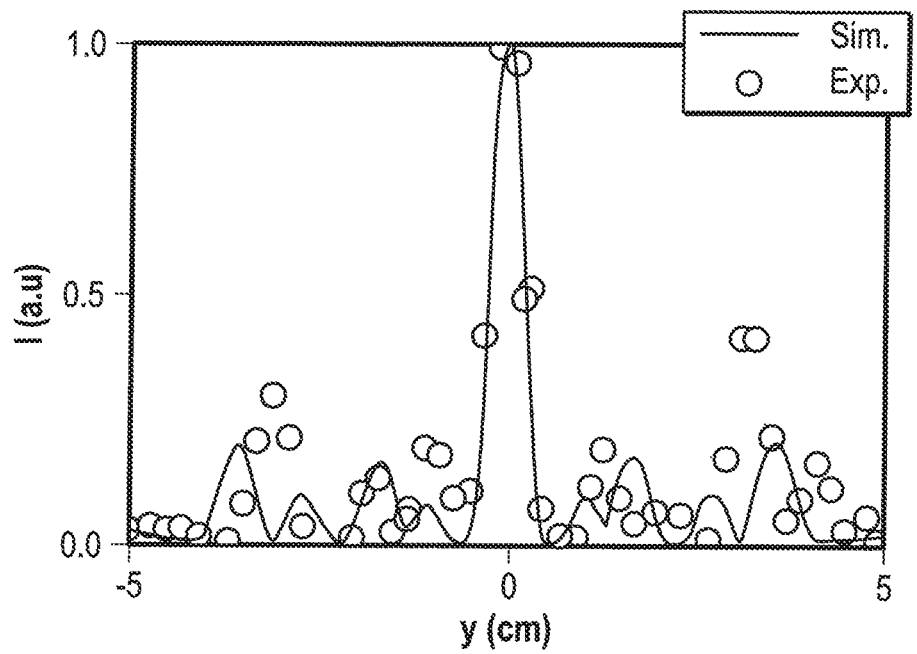
FIG. 9E depicts a cross-section of the power along the dashed lines on the maps for the first metalens in accordance with an illustrative embodiment.
Figure 9F:
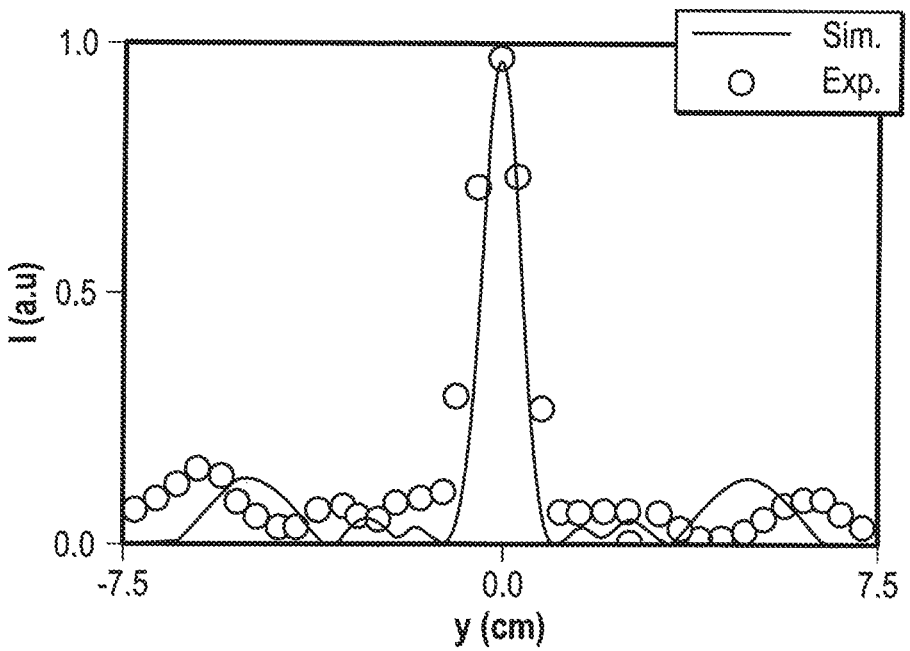
FIG. 9F depicts a cross-section of the power along the dashed lines on the maps for the second metalens in accordance with an illustrative embodiment.

FIG. 8A depicts a simulated $E_z$ field amplitude map along the x-y plane at a frequency of 38 GHz, with the black lines showing the contour of the first metalens in accordance with an illustrative embodiment. FIG. 8B depicts a simulated $E_z$ field amplitude map along the x-y plane at a frequency of 38 GHz, with the black lines showing the contour of the second metalens in accordance with an illustrative embodiment. In FIG. 8A, the first metalens has a focal distance of 2 $\lambda$. In FIG. 8B, the second metalens has a focal distance of 15 $\lambda$.

Measured and simulated intensity profiles for the first and second metalenses operated at 30 GHz are provided in FIG. 9. Specifically, FIG. 9A depicts simulated electromagnetic power maps along the x-y plane at the output of the first metalens at a frequency of 30 GHz in accordance with an illustrative embodiment. FIG. 9B depicts simulated electromagnetic power maps along the x-y plane at the output of the second metalens at a frequency of 30 GHz in accordance with an illustrative embodiment. FIG. 9C depicts experimental electromagnetic power maps along the x-y plane at the output of the first metalens at a frequency of 30 GHz in accordance with an illustrative embodiment. FIG. 9D depicts experimental electromagnetic power maps along the x-y plane at the output of the second metalens at a frequency of 30 GHz in accordance with an illustrative embodiment. FIG. 9E depicts a cross-section of the power along the dashed lines on the maps for the first metalens in accordance with an illustrative embodiment. FIG. 9F depicts a cross-section of the power along the dashed lines on the maps for the second metalens in accordance with an illustrative embodiment.

Figure 10A:
FIG. 10A is an electron microscope picture showing an infrared device made with SU-8 polymer and printed with a 3D-printer in accordance with an illustrative embodiment.
Figure 10B:
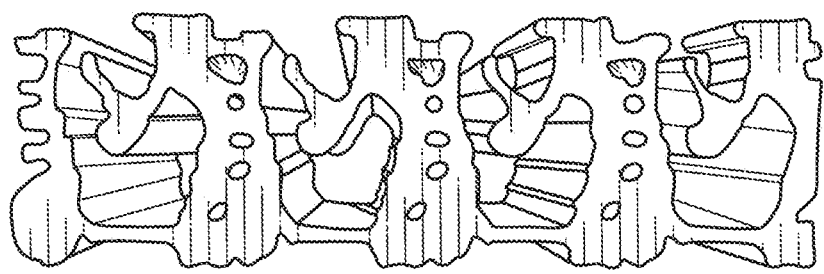
FIG. 10B depicts a larger plastic millimeter wave device having a similar shape to the device in FIG. 10A, in accordance with an illustrative embodiment.

Although one focus of the present application is on millimeter wave devices which can be printed with a consumer 3D-printer, the methods described herein can be extended to any type of electromagnetic radiation (e.g., UV, visible, Infrared, TeraHertz, mmWave, microwave, radio, etc.) as long as the right materials are used, the devices are scaled properly, and the 3D-printing fabrication method is capable of printing at the given scale. As one example, the methods and systems described herein can be used to fabricate devices 3,000 or more times smaller than the proof-of-concept devices described herein. To demonstrate this scalability, FIG. 10A is an electron microscope image showing an infrared device made with SU-8 polymer and printed with a 3D-printer in accordance with an illustrative embodiment. FIG. 10B depicts a larger plastic millimeter wave device having a similar shape to the device in FIG. 10A, in accordance with an illustrative embodiment. It is expected that the properties of the devices of FIG. 10A (i.e., infrared) and 10B (i.e., mmWave) are exactly the same.

Figure 11:
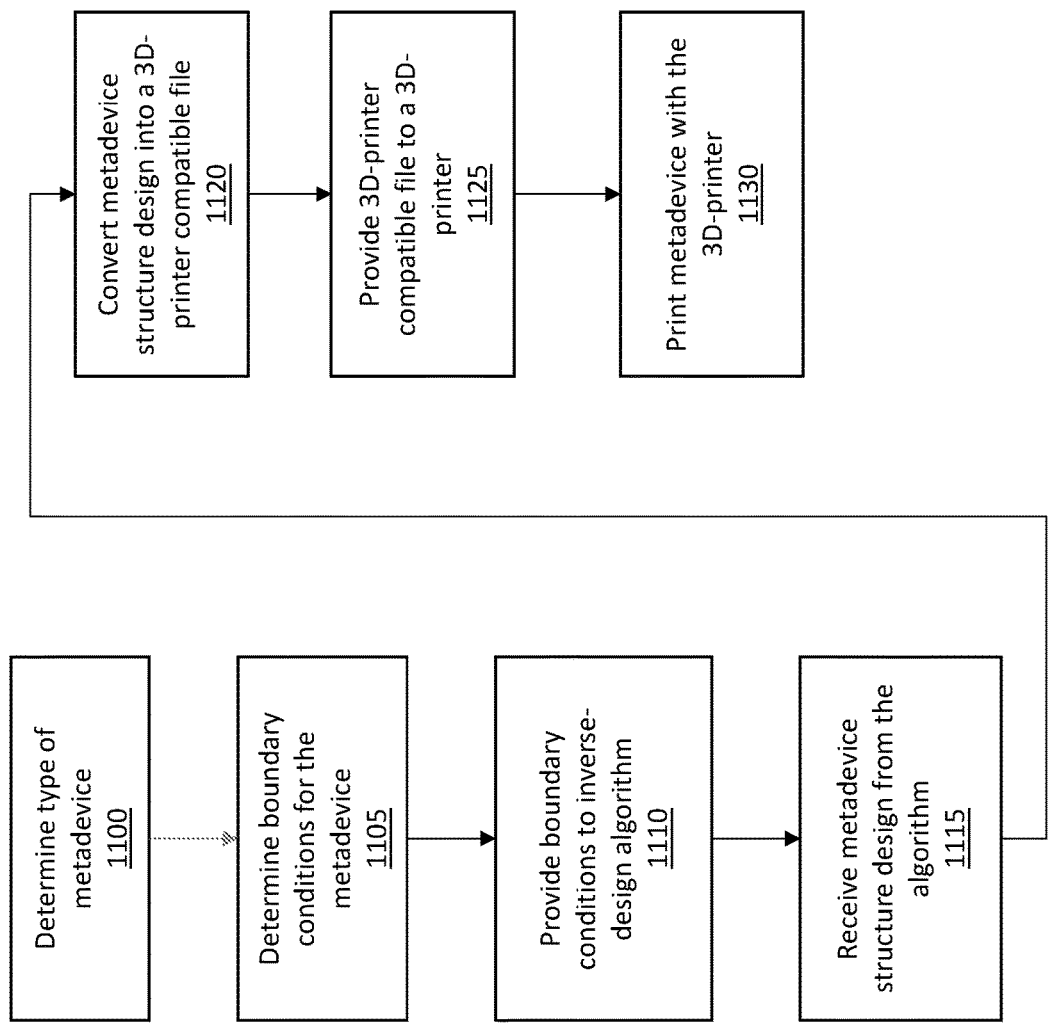
FIG. 11 is a flow diagram depicting a process for creating a metadevice in accordance with an illustrative embodiment.

FIG. 11 is a flow diagram depicting a process for creating a metadevice in accordance with an illustrative embodiment. In alternative embodiments, fewer, additional, and/or different operations may be performed. Also, the use of a flow diagram is not meant to be limiting with respect to the order of operations performed. In an operation 1100, a type of metadevice to be created is determined. The metadevice can be an optical metadevice, a mechanical metadevice, an acoustic metadevice, or any other type of metadevice. Examples of types of an optical metadevice include a lens to focus radiation at a specific distance, a polarization splitter to send different types of radiation in different directions, a polarization or wavelength filter that allows one polarization or wavelength to transmit while the other(s) are reflected, a bending device, a hologram device, a beam-shaping device to shape Gaussian beams, Bessel beams, etc., an antenna, an electromagnetic bandgap device, etc.

In an operation 1105, boundary conditions (or parameters) for the metadevice are determined. For example, the boundary conditions for a lens can include a focal distance and/or a numerical aperture, boundary conditions for a polarization splitter can include the angle(s) of deflection, boundary conditions for a filtering device include the polarization and/or wavelength that is to be filtered, and the boundary conditions for a bending device include the angle at which the radiation is to be bent. Additionally, boundary conditions for a hologram include hologram shape, wavelength, and polarization, boundary conditions for a beam-shaping device include the beam divergence, the boundary conditions for an antenna include gain and directivity, and boundary conditions for an EM bandgap device include a range of wavelengths in the bandgap. Additional boundary conditions (or parameters) for the above-described optical metadevices can include permittivity and permeability (which dictate the type of material used to form the device), device size, and whether the device is periodic or not, among others.

In an operation 1110, the boundary conditions for the determined metadevice are provided to an inverse-design algorithm in the form of an objective-first inverse-design algorithm. In alternative embodiments, different types of inverse-design approaches may be used. The inverse-design algorithm (or other algorithm) is configured to generate a design for the metadevice that satisfies all of the specified boundary conditions.

In an operation 1115, the metadevice structure design is received from the inverse-design algorithm. In an illustrative embodiment, an output from the inverse-design algorithm is in the form of a matrix representing a map of the permittivity and permeability values in a two-dimensional space. In alternative embodiments, the matrix values can be in a three-dimensional space.

In an operation 1120, the metadevice structure design is converted into a 3D-printer compatible file. The permittivity values in the matrix can originally have continuous values. In the conversion operation (1120), the originally continuous permittivity values are converted into a matrix of binary values representing the presence or absence of material. This matrix of binary values is converted into a black and white image using computer software such as OriginPro. Alternatively, a different type of software may be used. The black and white image is treated with image processing software to smooth any edges that are pixelated. The black and white image is also vectorized such that only the edges are kept. The vectorization can be performed using Autotracer, or alternatively a different vectorization tool may be used. In one embodiment, the vectorized image is converted into a .dxf format. Alternatively, other formats can be used. The vectorized image structure is converted into a full 2-D structure using a layout editor, and the 2-D structure file (e.g., .dxf file) is extruded to convert it into a 3-D structure having a given thickness. The extrusion can be performed by importing the .dxf file into Fusion 360 software, or alternatively different software may be used. A result of the extrusion is a .stl file in an illustrative embodiment. The .stl file is imported into a program (e.g., Cura) that converts the .stl file into a .gcode file, which is a format that describes the actions that a 3-D printer must take to print the structure.

In an operation 1125, the 3D-printer compatible file (e.g., .gcode file) is provided to a 3D-printer. In an operation 1130, the metadevice is printed with the 3D-printer. Any type of 3D-printer capable of the printing at the desired scale may be used.

As described herein, a platform for the design and fabrication of novel millimeter-wave and other metadevices using an inverse electromagnetic design algorithm and additive manufacturing is provided. The proposed design and fabrication method can be generalized to different electromagnetic and photonic devices, in which the desired responses can be defined as input and output electromagnetic field distributions. Although metadevices at millimeter-wave range are realized and demonstrated, due to scalability of Maxwell's equations, similar devices can be designed to operate at visible to microwave frequency ranges, provided that a low-loss dielectric material can be fabricated with subwavelength feature sizes. The presented platform addresses the need for rapid versatile design and prototyping of compact, low-cost, low-loss, and broadband components that can be easily integrated into complex electromagnetic systems. Additionally, acoustic and mechanical equations are similar to Maxwell's equations, and the inverse-design algorithms described herein can be extended to the design of acoustic and/or mechanical devices.

In an illustrative embodiment, any of the operations described herein may be performed by a computing system that includes a memory, processor, user interface, transceiver, and any other computing components. The operations can be stored as computer-readable instructions on a computer-readable medium such as the computer memory. Upon execution by the processor, the computer-readable instructions are executed as described herein.

Figure 12:
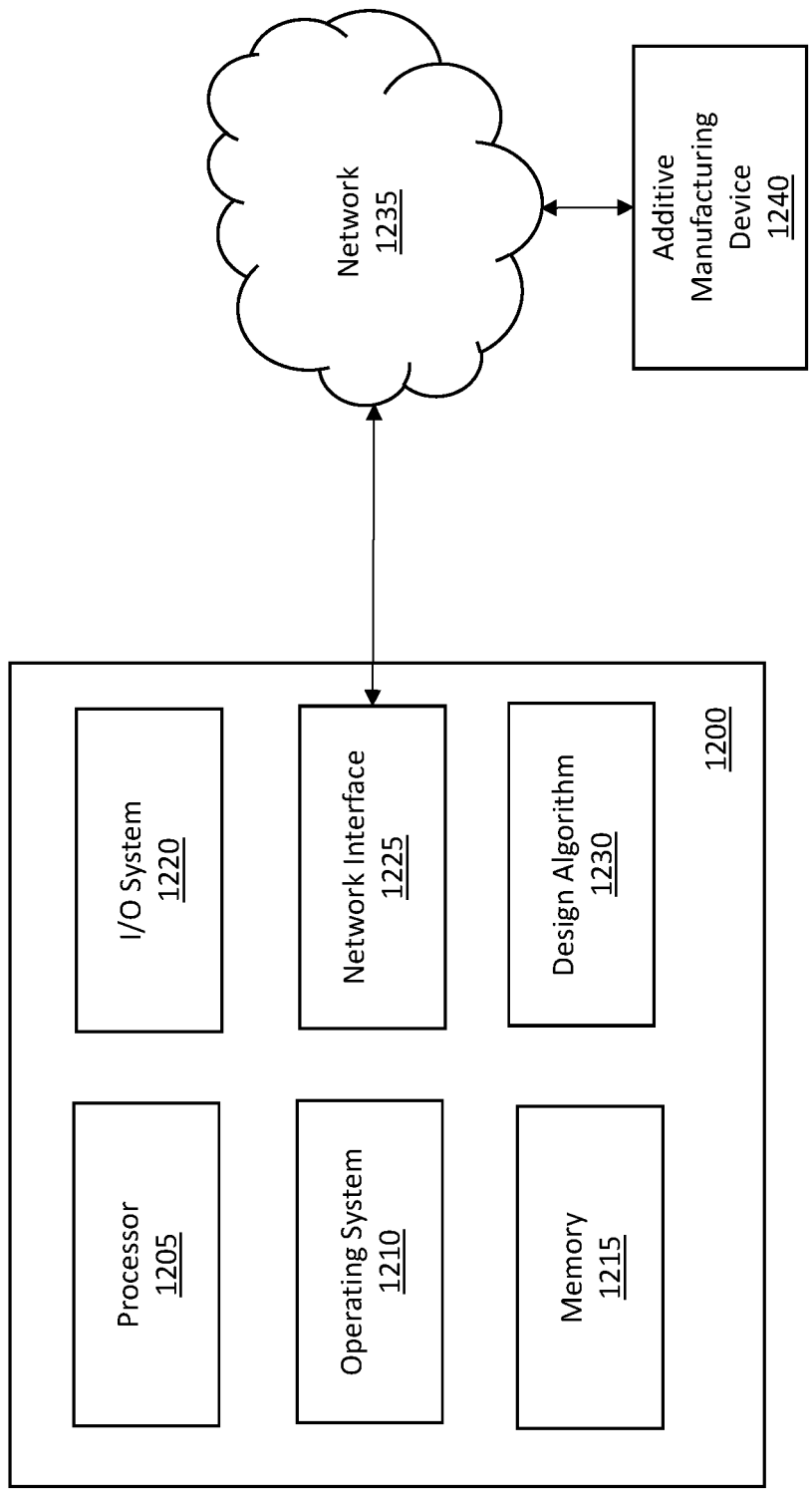
FIG. 12 is a block diagram of a computing system for generating metadevices in accordance with an illustrative embodiment.

FIG. 12 is a block diagram of a computing system 1200 for generating metadevices in accordance with an illustrative embodiment. The computing system 1200 includes a processor 1205, an operating system 1210, a memory 1215, an input/output (I/O) system 1220, a network interface 1225, and a design algorithm 1230. Additionally depicted is a network 1235 and an additive manufacturing device 1240. In alternative embodiments, the computing system 1200 may include fewer, additional, and/or different components. The components of the computing system communicate with one another via one or more buses or any other interconnect system. The computing system 1200 can be incorporated into a device such as a laptop computer, desktop computer, smart phone, tablet, workstation, server, imaging device, a manufacturing device such as the additive manufacturing device 1240, etc.

The processor 1205 can be any type of computer processor known in the art, and can include a plurality of processors and/or a plurality of processing cores. The processor 1205 can include a controller, a microcontroller, an audio processor, a graphics processing unit, a hardware accelerator, a digital signal processor, etc. Additionally, the processor 1205 may be implemented as a complex instruction set computer processor, a reduced instruction set computer processor, an x86 instruction set computer processor, etc. The processor is used to run the operating system 1210, which can be any type of operating system. The processor 1205 uses the design algorithm 1230 to process boundary conditions and generate a metadevice structure design. The processor 1205 also converts the metadevice structure design into a file that is compatible with the additive manufacturing device 1240, and provides the file of the metadevice structure design to the additive manufacturing device.

The operating system 1210 is stored in the memory 1215, which is also used to store programs, user data, network and communications data, peripheral component data, and the design algorithm 1230. The memory 1215 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1220 is the framework which enables users and peripheral devices to interact with the computing system 1200. The I/O system 1220 can include a mouse, a keyboard, one or more displays, a speaker, a microphone, and/or any other user interfaces that allow the user to interact with and control the computing system 1200. The I/O system 1220 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 1225 includes transceiver circuitry that allow the computing system to transmit and receive data to/from other devices such as remote computing systems, servers, websites, etc. The network interface 1225 enables communication through a network 1235, which can be one or more communication networks. The network 1235 can include a cable network, a fiber network, a cellular network, a wi-fi network, a landline telephone network, a microwave network, a satellite network, etc. The network interface 1225 also includes circuitry to allow device-to-device communication such as Bluetooth® communication. The additive manufacturing device 1240, which can be a 3-D printer, is used to generate a metadevice based on a design file received from the computing system 1200. The additive manufacturing device 1240 can receive the design file through the network 1235 in one embodiment. Alternatively, the additive manufacturing device 1240 can receive the design file via a direct connection between the computing system 1200 and the additive manufacturing device 1240. In another embodiment, the additive manufacturing device 1240 can be incorporated into the computing system 1200, or vice versa.

The design algorithm 1230 can include any type(s) of design algorithm which can be used to form a metadevice based on user specifications (i.e., boundary conditions, etc.). In an illustrative embodiment, the design algorithm is an inverse-design algorithm. In alternative embodiments, a different type of algorithm may be used. The processor 1205 uses the design algorithm to process boundary conditions and generate a metadevice structure design. In an alternative embodiment, the design algorithm 1230 can be remote or independent from the rest of the computing system 1200, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for creating metadevices, the method comprising:
   receiving, at a computing device, one or more boundary conditions for a metadevice;
   processing, with an inverse-design algorithm stored in a memory of the computing device, the one or more boundary conditions to generate a metadevice structure design that satisfies the one or more boundary conditions, wherein the metadevice structure design comprises a matrix, and wherein the matrix represents a map of permittivity values and permeability values in a two-dimensional space for the metadevice;
   converting, by a processor of the computing device, the metadevice structure design into a file that is compatible with an additive manufacturing device; and
   providing the file of the metadevice structure design to the additive manufacturing device.

2. The method of claim 1, further comprising creating, by the additive manufacturing device, the metadevice that satisfies the one or more boundary conditions.

3. The method of claim 2, wherein the additive manufacturing device comprises a three-dimensional printer.

4. The method of claim 1, wherein the metadevice comprises an optical metadevice, and wherein the optical metadevice is one of a lens, a polarization splitter, a filter, a bending device, a hologram, a beam-shaping device, an antenna, or an electromagnetic bandgap device.

5. The method of claim 1, wherein converting the metadevice structure design comprises converting the permittivity values into a matrix of binary values that represent presence or absence of material.

6. The method of claim 5, wherein converting the metadevice structure design further comprises converting the matrix of binary values into an image.

7. The method of claim 6, wherein converting the metadevice structure design further comprises smoothing edges of the image.

8. The method of claim 6, wherein converting the metadevice structure design further comprises vectorizing the image.

9. The method of claim 8, wherein converting the metadevice structure design further comprises converting the vectorized image into a full two-dimensional structure design.

10. The method of claim 9, wherein converting the metadevice structure design further comprises extruding the full two-dimensional structure design to generate a three-dimensional structure design having a thickness dimension.

11. The method of claim 1, wherein the one or more boundary conditions include at least one of focal distance, numerical aperture, angle of reflection, gain, directivity, permeability, and permittivity.

12. A system for generating metadevices, the system comprising:
    a memory configured to store an inverse-design algorithm;
    an interface configured to receive one or more boundary conditions for a metadevice; and
    a processor operatively coupled to the memory and the interface, wherein the processor is configured to:
      use the inverse-design algorithm to process the one or more boundary conditions and generate a metadevice structure design that satisfies the one or more boundary conditions, wherein the metadevice structure design comprises a matrix, and wherein the matrix represents a map of permittivity values and permeability values in a two-dimensional space for the metadevice;
      convert the metadevice structure design into a file that is compatible with an additive manufacturing device; and
      provide the file of the metadevice structure design to the additive manufacturing device.

13. The system of claim 12, further comprising the additive manufacturing device, wherein the additive manufacturing device is configured to create the metadevice that satisfies the one or more boundary conditions.

14. The system of claim 12, wherein conversion of the metadevice structure design comprises conversion of the permittivity values into the matrix, wherein the matrix includes binary values that represent presence or absence of material.

15. The system of claim 14, wherein conversion of the metadevice structure design further comprises conversion of the matrix of binary values into an image.

16. The system of claim 15, wherein conversion of the metadevice structure design further comprises vectorization of the image.

* * * * *